(12) United States Patent
Liu et al.

(10) Patent No.: US 10,259,278 B2
(45) Date of Patent: Apr. 16, 2019

(54) ONLINE INFLATING VALVE INSERTION DEVICE

(71) Applicant: CITIC Dicastal CO., LTD, Qinhuangdao (CN)

(72) Inventors: Weidong Liu, Qinhuangdao (CN); Jiandong Guo, Qinhuangdao (CN); Bowen Xue, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 174 days.

(21) Appl. No.: 15/636,735

(22) Filed: Jun. 29, 2017

(65) Prior Publication Data

US 2018/0001719 A1    Jan. 4, 2018

(30) Foreign Application Priority Data

Jun. 29, 2016  (CN) .......................... 2016 1 0492021

(51) Int. Cl.
| | | |
|---|---|---|
| *B60S 5/04* | (2006.01) | |
| *B60C 23/04* | (2006.01) | |
| *B60C 25/05* | (2006.01) | |
| *B60C 25/138* | (2006.01) | |
| *B60C 25/00* | (2006.01) | |

(52) U.S. Cl.
CPC .......... *B60C 23/0494* (2013.01); *B60C 25/00* (2013.01); *B60C 25/0509* (2013.01); *B60S 5/046* (2013.01); *B60C 25/0515* (2013.01); *B60C 25/138* (2013.01)

(58) Field of Classification Search
CPC ... B60C 23/0494; B60C 25/00; B60C 25/046; B60C 25/0509; B60C 25/0515; B60C 25/138
See application file for complete search history.

(56) References Cited

U.S. PATENT DOCUMENTS 9,840,234 B2 *  12/2017  Lawson ................ B60C 25/145
2017/0096038 A1 *  4/2017  Hicks .................. B60C 25/0515

* cited by examiner

*Primary Examiner* — David B. Thomas
(74) *Attorney, Agent, or Firm* — Maier & Maier, PLLC

(57) ABSTRACT

The present invention discloses an online inflating valve insertion device. The online inflating valve insertion device has a frame, a chassis, a lift cylinder, a support A, bearing seats, linear bearings, a mounting plate, guide shafts, a lift shaft, a servomotor A, a synchronous pulley A, a connecting plate, a synchronous belt, a synchronous pulley B, a base, a connecting shaft A, a servomotor B, a shaft sleeve A, a lower end cover, a connecting shaft B, a shaft sleeve B and the like. The online inflating valve insertion device provided by the present invention can meet the requirement of automatically inserting an inflating valve into a wheel, also has the characteristics of simple structure, convenience in manufacturing, stable performance, and capability of meeting the precision machining requirement, and can fit to the requirement of automatic production.

2 Claims, 4 Drawing Sheets

ONLINE INFLATING VALVE INSERTION DEVICE

TECHNICAL FIELD

The present invention relates to a machining device, and in particular to an online inflating valve insertion device applied to a wheel machining process.

BACKGROUND ART

A wheel needs 100% air-leakage detection in order to ensure the quality of the wheel in an automobile wheel machining process, and in such detection process, an inflating valve needs to be added to a machined wheel in order to ensure the authenticity and the reliability of a detection result. Additionally, wheel manufacturing enterprises generally utilize an inflating valve manual installation method. However, as the automation degree of production is gradually increased, a manipulator gradually replaces a worker to install the inflating valve. The present invention provides an inflating valve automatic supply device, which matches with the manipulator to complete a function of installing the inflating valve on the wheel.

SUMMARY OF THE INVENTION

An objective of the present invention is to provide an online inflating valve insertion device.

To achieve the object described above, a technical solution of the present invention is as follows: an online inflating valve insertion device is composed of a frame, a chassis, a lift cylinder, a support A, bearing seats, linear bearings, a mounting plate, guide shafts, a lift shaft, a servomotor A, a synchronous pulley A, a connecting plate, a synchronous belt, a synchronous pulley B, a base, a connecting shaft A, a servomotor B, a shaft sleeve A, a lower end cover, a connecting shaft B, a shaft sleeve B, an oil cylinder, bearings A, end covers, a gland, a bearing B, a chassis, a flange, pins, springs, expanding flaps, a connecting shaft C, a protector, an expanding core, a servomotor C, a lead screw A, a linear guide rail A, a sliding support, a linear guide rail B, a lead screw B, a servomotor D, a support B, an inflating valve, a mechanical clamping jaw, a turning block, a servomotor E, a lead screw C, a turning seat, a mounting rack, a support C and a vision sensor. The chassis, the support C and the mounting rack are fixed on the frame, the vision sensor is mounted on the support C, the mounting plate is fixed above the chassis by the support A, the bearing seats are fixed on the mounting plate, the lift shaft is mounted on the bearing seats through the linear bearings, two ends of the lift shaft are respectively connected with the connecting plate and an output shaft of the lift cylinder, the servomotor A and the base are fixed on the connecting plate, the shaft sleeve A is mounted on the base through the bearings A and the end covers, the synchronous pulley A is connected with an output shaft of the servomotor A, the synchronous pulley B is connected with the connecting shaft A, and the synchronous belt is respectively connected with the synchronous pulley A and the synchronous pulley B.

The lower end cover, the gland and the chassis are fixed on the shaft sleeve A, the servomotor B is mounted on the lower end cover, the shaft sleeve B is mounted on the base through the bearing B and the gland, the oil cylinder is fixed in the interior of the shaft sleeve B, an output end of the oil cylinder is connected with the connecting shaft C, the servomotor B is connected with the shaft sleeve B through the connecting shaft B, the expanding core is connected with the shaft sleeve B through the connecting shaft C, the expanding core, the connecting shaft C and the shaft sleeve B are circumferentially locked and cannot relatively rotate, and the connecting shaft C and the shaft sleeve B can relatively axially move; the flange is fixed on the chassis, eight uniformly distributed T-shaped chutes are formed in internal cavities of the flange and the chassis, the bottom surfaces of eight expanding flaps are respectively in one-to-one correspondence with the eight T-shaped chutes, the expanding flaps can smoothly and highly precisely slide in the chutes, inner side walls of the expanding flaps are slopes of 15 degrees, and two ends of eight springs are respectively connected with the flange and the eight expanding flaps; side faces of the expanding core are two groups of slopes of 15 degrees in uniform and spaced distribution, the number of the slopes in each group is eight, every two slopes have height difference, and side walls of the upper ends of the two groups of slopes are jointed on a conical surface; under the combined action of the pulling force of the oil cylinder and the elastic force of the springs, when the expanding core is located at the lowest position, side walls of the expanding flaps contact with the conical surface of the expanding core, the servomotor B drives the expanding core to rotate for 22.5 degrees through the connecting shaft B, the shaft sleeve B and the connecting shaft C, and the expanding flaps macthing with the slopes can be switched between the slopes of the expanding core. The oil cylinder drives the connecting shaft C and the expanding core to move up and down; due to the slope matching of the expanding flaps and the expanding core, the eight expanding flaps synchronously perform centripetal motion and centrifugal motion in the eight uniformly distributed T-shaped chutes formed in the internal cavities of the flange and the chassis, so that the eight expanding flaps implement high-precision synchronous expansion and shrinkage functions; due to height difference between two groups of uniformly spaced slopes of side faces of the expanding core, the servomotor B drives the expanding core to rotate for 22.5 degrees, and the expanding flaps matching with the slopes can be switched between the two groups of uniformly spaced slopes of the expanding core, so that the expansion and shrinkage diameters of the expanding flaps change in two different ranges, and finally the expanding flaps implement large-stroke expansion and shrinkage.

Corresponding pin holes are formed in the chassis and the flange, and the positioning pins are respectively connected with the pin holes in the chassis and the flange to ensure assembly precision of the chassis and the flange.

The servomotor C and the linear guide rail A are fixed on the mounting rack, the lead screw A is connected with the sliding support and the servomotor C, and the servomotor C can drive the sliding support to move along the linear guide rail A up and down through the lead screw A; and the linear guide rail B and the servomotor D are fixed on the sliding support, the lead screw B is connected with the support B and the servomotor D, and the servomotor D can drive the support B to move along the linear guide rail B left and right through the lead screw B.

The servomotor E and the turning seat are fixed on the support B, the servomotor E is connected with the lead screw C, the mechanical clamping jaw is fixed on the turning block, the mechanical clamping jaw clamps the inflating valve, an empty slot is formed in the middle of the bottom surface of the turning seat, the lead screw C passes through the empty slot, two symmetrical T-shaped annular grooves are formed in two sides of the interior of the turning seat, two symmetrical T-shaped annular columns are arranged on the lower end face of the turning block, and the T-shaped annular columns can be inserted into the T-shaped annular grooves; the structure of the middle position of the lower end face of the turning block is annual teeth, and the annular teeth and the lead screw C are meshed. The servomotor E drives the lead screw C to rotate, and due to the meshing matching between the annular teeth and the lead screw C, the turning block can turn along the centers of the T-shaped annular grooves in the turning seat.

During actual use, a wheel is conveyed to a working position of the online inflating valve insertion device provided by the present invention through roller ways; compressed air is supplied, the lift cylinder drives a clamping mechanism to lift up, a flange face of the wheel is in contact with the flange, and next, the lift cylinder lifts up the wheel to an appointed position. An oil cylinder rod of the oil cylinder is in a shrinkage state, and under the action of the springs, the slopes of the expanding flaps are in contact with the upper conical surface of the expanding core. According to the size of the diameter of a center bore of the wheel, the servomotor A drives the expanding core to rotate for a specific angle, so that the slopes of the expanding flaps match with the corresponding slopes of the expanding core, and next, the oil cylinder starts working; the oil cylinder overcomes the elastic forces of the springs to drive the connecting shaft C and the expanding core to move upwards; due to the slope matching between the expanding flaps and the expanding core, each expanding flap synchronously moves outwards in the eight uniformly distributed T-shaped chutes formed in the internal cavities of the flange and the chassis, and finally the expanding flaps come into contact with the center bore of the wheel, so that a location expansion process of the wheel is completed; next, the servomotor A starts working and drives the wheel to rotate through the synchronous pulley A, the synchronous belt, the synchronous pulley B; the vision sensor detects the position of a valve hole of the wheel, the wheel continuously rotates for 180 degrees and then stops, and at this point, the valve hole of the wheel, the inflating valve and the expanding core are positioned on a same vertical plane. According to various machining parameters of the valve hole of the wheel, the servomotor E rotates for an appointed revolution and controls the inflating valve and the valve hole of the wheel to be at a same angle, then, the servomotor C and the servomotor D control horizontal and vertical positions of the inflating valve, and finally the inflating valve is inserted into the valve hole of the wheel. So far, an inflating valve insertion operation is completed.

The online inflating valve insertion device provided by the present invention can meet the requirement of automatically inserting the inflating valve into the wheel, also has the characteristics of simple structure, convenience in manufacturing, stable performance, and capability of meeting the precision machining requirement, and can fit to the requirement of automatic production.

Figure 1:
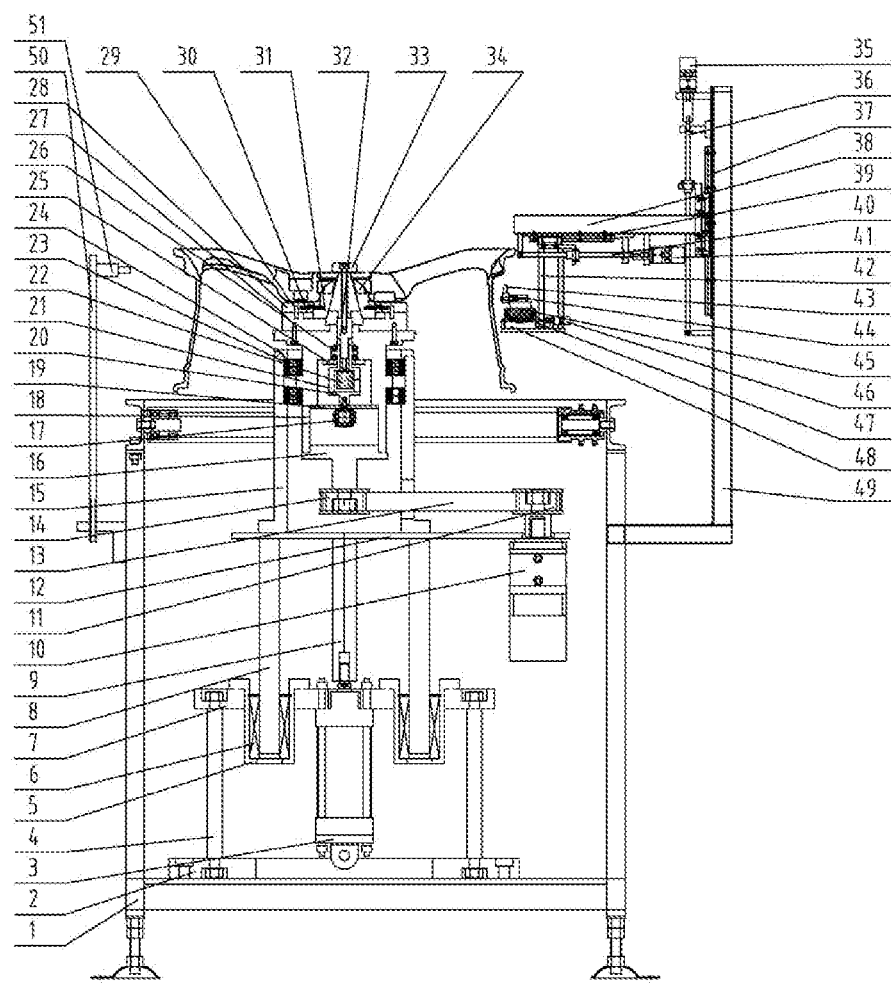
FIG. 1 is a structural schematic diagram of an online inflating valve insertion device provided by the present invention.
Figure 2:
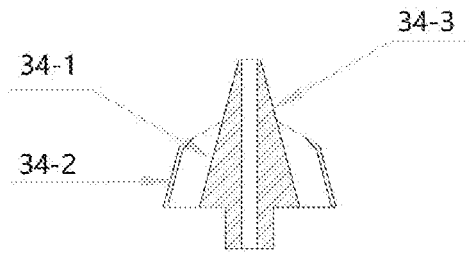
FIG. 2 is a front schematic view of an expanding core of an online inflating valve insertion device provided by the present invention.
Figure 3:
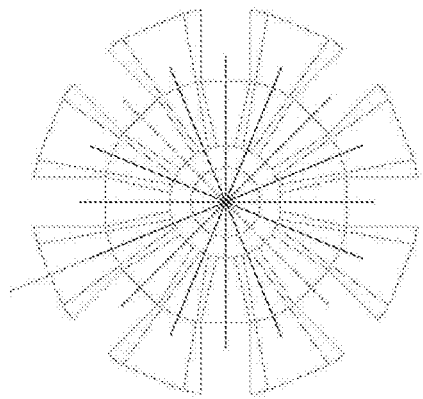
FIG. 3 is a top schematic view of an expanding core of an online inflating valve insertion device provided by the present invention.
Figure 4:
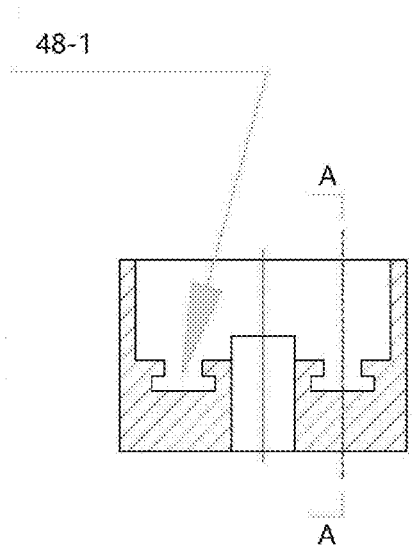
FIG. 4 is a structural schematic diagram of a turning seat of an online inflating valve insertion device provided by the present invention.
Figure 5:
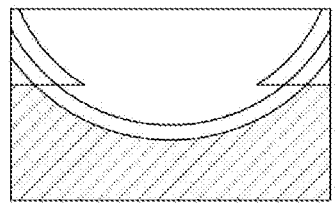
FIG. 5 is an A-A structural schematic diagram of a turning seat of an online inflating valve insertion device provided by the present invention.
Figure 6:
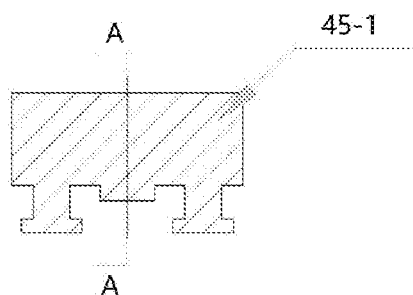
FIG. 6 is a structural schematic diagram of a turning block of an online inflating valve insertion device provided by the present invention.
Figure 7:
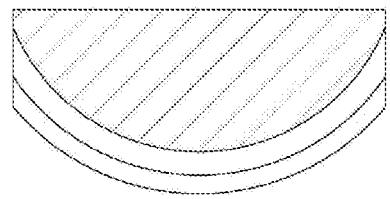
FIG. 7 is an A-A structural schematic diagram of a turning block of an online inflating valve insertion device provided by the present invention.
Figure 8:
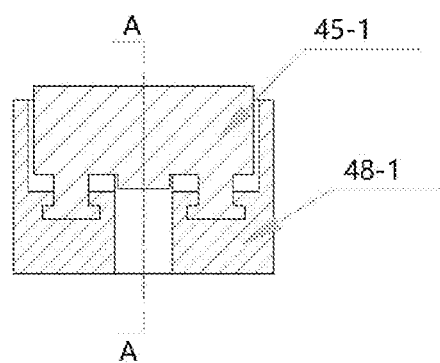
FIG. 8 is a structural schematic diagram of a turning mechanism of an online inflating valve insertion device provided by the present invention.
Figure 9:
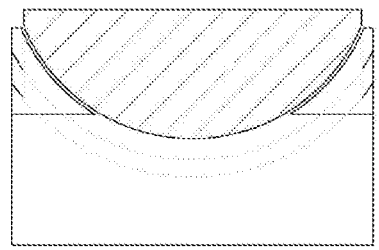
FIG. 9 is an A-A structural schematic diagram of a turning mechanism of an online inflating valve insertion device provided by the present invention.

In the figure, numeric symbols are as follows: 1-frame, 2-chassis, 3-lift cylinder, 4-support A, 5-bearing base, 6-linear bearing, 7-mounting plate, 8-guide shaft, 9-lift shaft, 10-servomotor A, 11-synchronous pulley A, 12-connecting plate, 13-synchronous belt, 14-synchronous pulley B, 15-base, 16-connecting shaft A, 17-servomotor B, 18-shaft sleeve A, 19-lower end cover, 20-connecting shaft B, 21-shaft sleeve B, 22-oil cylinder, 23-bearing A, 24-end cover, 25-gland, 26-bearing B, 27-chassis, 28-flange, 29-pin, 30-spring, 31-expanding flap, 32-connecting shaft C, 33-protector, 34-expanding core, 35-servomotor C, 35-lead screw A, 37-linear guide rail A, 38-sliding support, 39-linear guide rail B, 40-lead screw B, 41-servomotor D, 42-support B, 43-inflating valve, 44-mechanical clamping jaw, 45-turning block, 46-servomotor E, 47-lead screw C, 48-turning seat, 49-mounting rack, 50-support C, and 51-vision sensor.

DETAILED DESCRIPTION OF THE INVENTION

In the following, the details and working conditions of a specific device provided by the present invention are described in combination with figures.

The present invention provides an online inflating valve insertion device. The online inflating valve insertion device is composed of a frame 1, a chassis 2, a lift cylinder 3, a support A 4, bearing seats 5, linear bearings 6, a mounting plate 7, guide shafts 8, a lift shaft 9, a servomotor A 10, a synchronous pulley A 11, a connecting plate 12, a synchronous belt 13, a synchronous pulley B 14, a base 15, a connecting shaft A 16, a servomotor B 17, a shaft sleeve A 18, a lower end cover 19, a connecting shaft B 20, a shaft sleeve B 21, an oil cylinder 22, bearings A 23, end covers 24, a gland 25, a bearing B 26, a chassis 27, a flange 28, pins 29, springs 30, expanding flaps 31, a connecting shaft C 32, a protector 33, an expanding core 34, a servomotor C 35, a lead screw A 36, a linear guide rail A 37, a sliding support 38, a linear guide rail B 39, a lead screw B 40, a servomotor D 41, a support B 42, an inflating valve 43, a mechanical clamping jaw 44, a turning block 45, a servomotor E 46, a lead screw C 47, a turning seat 48, a mounting rack 49, a support C 50 and a vision sensor 51. The online inflating valve insertion device is characterized in that the chassis 2, the support C 50 and the mounting rack 49 are fixed on the frame 1, the vision sensor 51 is mounted on the support C 50, the mounting plate 7 is fixed above the chassis 2 by the support A 4, the bearing seats 5 are fixed on the mounting plate 7, the lift shaft 9 is mounted on the bearing seats 5 through the linear bearings 6, two ends of the lift shaft 9 are respectively connected with the connecting plate 12 and an output shaft of the lift cylinder 3, the servomotor A 10 and the base 15 are fixed on connecting plate 12, the shaft sleeve A 18 is mounted on the base 15 through the bearings A 23 and the end covers 24, the synchronous pulley A 11 is connected with an output shaft of the servomotor A 10, the synchronous pulley B 14 is connected with the connecting shaft A 16, and the synchronous belt 13 is respectively connected with the synchronous pulley A 11 and the synchronous pulley B 14.

The lower end cover 19, the gland 25 and the chassis 27 are fixed on the shaft sleeve A 18, the servomotor B 17 is mounted on the lower end cover 19, the shaft sleeve B 21 is mounted on the base 15 through the bearing B 26 and the gland 25, the oil cylinder 22 is fixed in the interior of the shaft sleeve B 21, an output end of the oil cylinder 22 is connected with the connecting shaft C 32, the servomotor B 17 is connected with the shaft sleeve B 21 through the connecting shaft B 20, the expanding core 34 is connected with the shaft sleeve B 21 through the connecting shaft C 32, the expanding core 34, the connecting shaft C 32 and the shaft sleeve B 21 are circumferentially locked and cannot relatively rotate, and the connecting shaft C 32 and the shaft sleeve B 21 can relatively axially move; the flange 28 is fixed on the chassis 27, eight uniformly distributed T-shaped chutes are formed in internal cavities of the flange 28 and the chassis 27, bottom surfaces of eight expanding flaps 31 are respectively in one-to-one correspondence with the eight T-shaped chutes, the expanding flaps 31 can smoothly and highly precisely slide in the chutes, inner side walls of the expanding flaps 31 are slopes of 15 degrees, and two ends of eight springs 30 are respectively connected with the flange 28 and the eight expanding flaps 31; side faces of the expanding core 34 are two groups of slopes 34-1, 34-2 of 15 degrees in uniform and spaced distribution, the number of the slopes in each group is eight, every two slopes have height difference, and side walls of the upper ends of the two groups of slopes are jointed on a conical surface 34-3; under the combined action of the pulling force of the oil cylinder 22 and the elastic force of the springs 30, when the expanding core 34 is located at the lowest position, side walls of the expanding flaps 31 contact with the conical surface 34-3 of the expanding core 34, the servomotor B 17 drives the expanding core 34 to rotate for 22.5 degrees through the connecting shaft B 20, the shaft sleeve B 21 and the connecting shaft C 32, and the expanding flaps 31 matching with the slopes can be switched between the slopes 34-1 and the slopes 35-2 of the expanding core 34. The oil cylinder 22 drives the connecting shaft C 32 and the expanding core 34 to move up and down; due to the slope matching of the expanding flaps 31 and the expanding core 34, the eight expanding flaps 31 synchronously perform centripetal motion and centrifugal motion in the eight uniformly distributed T-shaped chutes formed in the internal cavities of the flange 28 and the chassis 27, so that the eight expanding flaps 31 implement high-precision synchronous expansion and shrinkage functions; due to height difference between two groups of uniformly spaced slopes of the side faces of the expanding core 34, the servomotor B 17 drives the expanding core 34 to rotate for 22.5 degrees, and the expanding flaps 31 matching with the slopes can be switched between the slopes 34-1 and the slopes 34-2 of the expanding core 34, so that the expansion and shrinkage diameters of the expanding flaps 31 change in two different ranges, and finally the expanding flaps 31 implement large-stroke expansion and shrinkage.

Corresponding pin holes are formed in the chassis 27 and the flange 28, and the positioning pins 29 are respectively connected with the pin holes in the chassis 27 and the flange 28 to ensure assembly precision of the chassis 27 and the flange 28.

The servomotor C 35 and the linear guide rail A 37 are fixed on the mounting rack 49, the lead screw A 36 is connected with the sliding support 38 and the servomotor C 35, and the servomotor C 35 can drive the sliding support 38 to move along the linear guide rail A 37 up and down through the lead screw A 36; and the linear guide rail B 39 and the servomotor D 41 are fixed on the sliding support 38, the lead screw B 40 is connected with the support B 42 and the servomotor D 41, and the servomotor D 41 can drive the support B 42 to move along the linear guide rail B 39 left and right through the lead screw B 40.

The servomotor E 46 and the turning seat 48 are fixed on the support B 42, the servomotor E 46 is connected with the lead screw C 47, the mechanical clamping jaw 44 is fixed on the turning block 45, the mechanical clamping jaw 44 clamps the inflating valve 43, the servomotor E 46 is connected with the lead screw C 47, an empty slot 48-2 is formed in the middle of the bottom surface of the turning seat 48, the lead screw C 47 passes through the empty slot 48-2, two symmetrical T-shaped annular grooves 48-1 are formed in two sides of the interior of the turning seat 48, two symmetrical T-shaped annular columns 45-1 are arranged on the lower end face of the turning block 45, and the T-shaped annular columns 45-1 can be inserted into the T-shaped annular grooves 48-1; the structure of the middle position of the lower end face of the turning block 45 is annual teeth 45-2, and the annular teeth 45-2 and the lead screw C 47 are meshed. The servomotor E 46 drives the lead screw C 47 to rotate, and due to the meshing matching between the annular teeth 45-2 and the lead screw C 47, the turning block 45 can turn along the centers of the T-shaped annular grooves 48-1 in the turning seat 48.

During actual use, a wheel is conveyed to a working position of the online inflating valve insertion device provided by the present invention through roller ways; compressed air is supplied, the lift cylinder 3 drives a clamping mechanism to lift up, a flange face of the wheel is in contact with the flange 28, and next, the lift cylinder 3 lifts up the wheel to an appointed position. An oil cylinder rod of the oil cylinder 22 is in a shrinkage state, and under the action of the springs 30, the slopes of the expanding flaps 31 are in contact with the upper conical surface of the expanding core 34. According to the size of the diameter of a center bore of the wheel, the servomotor A 10 drives the expanding core 34 to rotate for a specific angle, so that the slopes of the expanding flaps 31 match with the corresponding slopes of the expanding core 34, and next, the oil cylinder 22 starts working; the oil cylinder 22 overcomes the elastic forces of the springs 30 to drive the connecting shaft C 32 and the expanding core 34 to move upwards; due to the slope matching between the expanding flaps 31 and the expanding core 33, each expanding flap 31 synchronously moves outwards in the eight uniformly distributed T-shaped chutes formed in the internal cavities of the flange 28 and the chassis 27, and finally the expanding flaps 31 come into contact with the center bore of the wheel, so that a location expansion process of the wheel is completed; next, the servomotor A 10 starts working and drives the wheel to rotate through the synchronous pulley A 11, the synchronous belt 13, the synchronous pulley B 14; the vision sensor 51 detects the position of a valve hole of the wheel, the wheel continuously rotates for 180 degrees and then stops, and at this point, the valve hole of the wheel, the inflating valve and the expanding core 34 are positioned on a same vertical plane. According to various machining parameters of the valve hole of the wheel, the servomotor E 46 rotates for an appointed revolution and controls the inflating valve 43 and the valve hole of the wheel to be a same angle, then, the servomotor C 35 and the servomotor D 41 control horizontal and vertical positions of the inflating valve, and finally the inflating valve is inserted into the valve hole of the wheel. So far, an inflating valve insertion operation is completed.

The invention claimed is:

1. An online inflating valve insertion device, comprising:

a frame, a chassis, a lift cylinder, a support A, bearing seats, linear bearings, a mounting plate, guide shafts, a lift shaft, a servomotor A, a synchronous pulley A, a connecting plate, a synchronous belt, a synchronous pulley B, a base, a connecting shaft A, a servomotor B, a shaft sleeve A, a lower end cover, a connecting shaft B, a shaft sleeve B, an oil cylinder, bearings A, end covers, a gland, a bearing B, a chassis, a flange, pins, springs, expanding flaps, a connecting shaft C, a protector, an expanding core, a servomotor C, a lead screw A, a linear guide rail A, a sliding support, a linear guide rail B, a lead screw B, a servomotor D, a support B, an inflating valve, a mechanical clamping jaw, a turning block, a servomotor E, a lead screw C, a turning seat, a mounting rack, a support C and a vision sensor;

wherein the chassis, the support C and the mounting rack are fixed on the frame, the vision sensor is mounted on the support C, the mounting plate is fixed above the chassis by the support A, the bearing seats are fixed on the mounting plate, the lift shaft is mounted on the bearing seats through the linear bearings, two ends of the lift shaft are respectively connected with the connecting plate and an output shaft of the lift cylinder, the servomotor A and the base are fixed on the connecting plate, the shaft sleeve A is mounted on the base through the bearings A and the end covers, the synchronous pulley A is connected with an output shaft of the servomotor A, the synchronous pulley B is connected with the connecting shaft A, and the synchronous belt is respectively connected with the synchronous pulley A and the synchronous pulley B;

the lower end cover, the gland and the chassis are fixed on the shaft sleeve A, the servomotor B is mounted on the lower end cover, the shaft sleeve B is mounted on the shaft sleeve A through the bearing B and the gland, the oil cylinder is fixed in the interior of the shaft sleeve B, an output end of the oil cylinder is connected with the connecting shaft B, the servomotor B is connected with the shaft sleeve B through the connecting shaft B, the expanding core is connected with the shaft sleeve B through the connecting shaft C, the expanding core, the connecting shaft C and the shaft sleeve B are circumferentially locked and cannot relatively rotate, and the connecting shaft C and the shaft sleeve B can relatively axially move; the flange is fixed on the chassis, eight uniformly distributed T-shaped chutes are formed in internal cavities of the flange and the chassis, bottom surfaces of eight expanding flaps are respectively in one-to-one correspondence with the eight T-shaped chutes, the expanding flaps can smoothly and highly precisely slide in the chutes, inner side walls of the expanding flaps are slopes of 15 degrees, and two ends of eight springs are respectively connected with the flange and the eight expanding flaps; side faces of the expanding core are two groups of slopes of 15 degrees in uniform and spaced distribution, the number of the slopes in each group is eight, every two slopes have height difference, and side walls of the upper ends of the two groups of slopes are jointed on a conical surface; under the combined action of the pulling force of the oil cylinder and the elastic force of the springs, when the expanding core is located at the lowest position, side walls of the expanding flaps contact with the conical surface of the expanding core, the servomotor B drives the expanding core to rotate for 22.5 degrees through the connecting shaft B, the shaft sleeve B and the connecting shaft C, and the expanding flaps matching with the slopes can be switched between the slopes and the slopes of the expanding core; the oil cylinder drives the connecting shaft C and the expanding core to move up and down; and due to the slope matching of the expanding flaps and the expanding core, the eight expanding flaps synchronously perform centripetal motion and centrifugal motion in the eight uniformly distributed T-shaped chutes formed in the internal cavities of the flange and the chassis, so that the eight expanding flaps implement high-precision synchronous expansion and shrinkage functions;

the servomotor C and the linear guide rail A are fixed on the mounting rack, the lead screw A is connected with the sliding support and the servomotor C, and the servomotor C can drive the sliding support to move along the linear guide rail A up and down through the lead screw A; the linear guide rail B and the servomotor D are fixed on the sliding support, the lead screw B is connected with the support B and the servomotor D, and the servomotor D can drive the support B to move along the linear guide rail B left and right through the lead screw B; and the servomotor E and the turning seat are fixed on the support B, the servomotor E is connected with the lead screw C, the mechanical clamping jaw is fixed on the turning block, the mechanical clamping jaw clamps the inflating valve, the servomotor E is connected with the lead screw C, an empty slot is formed in the middle of the bottom surface of the turning seat, the lead screw C passes through the empty slot, two symmetrical T-shaped annular grooves are formed in two sides of the interior of the turning seat, two symmetrical T-shaped annular columns are arranged on the lower end face of the turning block, and the T-shaped annular columns can be inserted into the T-shaped annular grooves; the structure of the middle position of the lower end face of the turning block is annual teeth, and the annular teeth and the lead screw C are meshed; and the servomotor E drives the lead screw C to rotate, and due to the meshing matching between the annular teeth and the lead screw C, the turning block can turn along the centers of the T-shaped annular grooves in the turning seat.

2. The online inflating valve insertion device according to claim 1, wherein corresponding pin holes are formed in the chassis and the flange, and the positioning pins are respectively connected with the pin holes in the chassis and the flange to ensure assembly precision of the chassis and the flange.

* * * * *